United States Patent [19]

West et al.

[11] 3,954,020
[45] May 4, 1976

[54] ROTATIONAL DRIVE ASSEMBLY
[75] Inventors: John D. West; James G. Morrow, Sr., both of Manitowoc, Wis.
[73] Assignee: The Manitowoc Company, Inc., Manitowoc, Wis.
[22] Filed: Apr. 24, 1975
[21] Appl. No.: 571,302

[52] U.S. Cl. .............................................. 74/410
[51] Int. Cl.² ........................................ F16H 57/00
[58] Field of Search ..................................... 74/410

[56] References Cited
UNITED STATES PATENTS

| | | | |
|---|---|---|---|
| 2,496,857 | 2/1950 | Cronstedt et al. | 74/410 |
| 3,307,433 | 3/1967 | Bennett et al. | 74/410 X |
| 3,333,482 | 8/1967 | Wildhaber | 74/410 X |

Primary Examiner—Leonard H. Gerin
Attorney, Agent, or Firm—Wolfe, Hubbard, Leydig, Voit & Osann, Ltd.

[57] ABSTRACT

A rotational drive assembly including a pair of pinion gears journalled on idler shafts disposed laterally on either side of a drive shaft and meshing with the teeth of a drive gear and a ring gear. The drive shaft is universally journalled for rotation and for permitting a limited range of movement of the drive gear toward and away from the ring gear to substantially equalize tooth contact between the drive gear and each of the pinion gears as the drive shaft is rotated. A slotted bearing may be provided to preclude excess lateral movement of the drive shaft.

10 Claims, 9 Drawing Figures

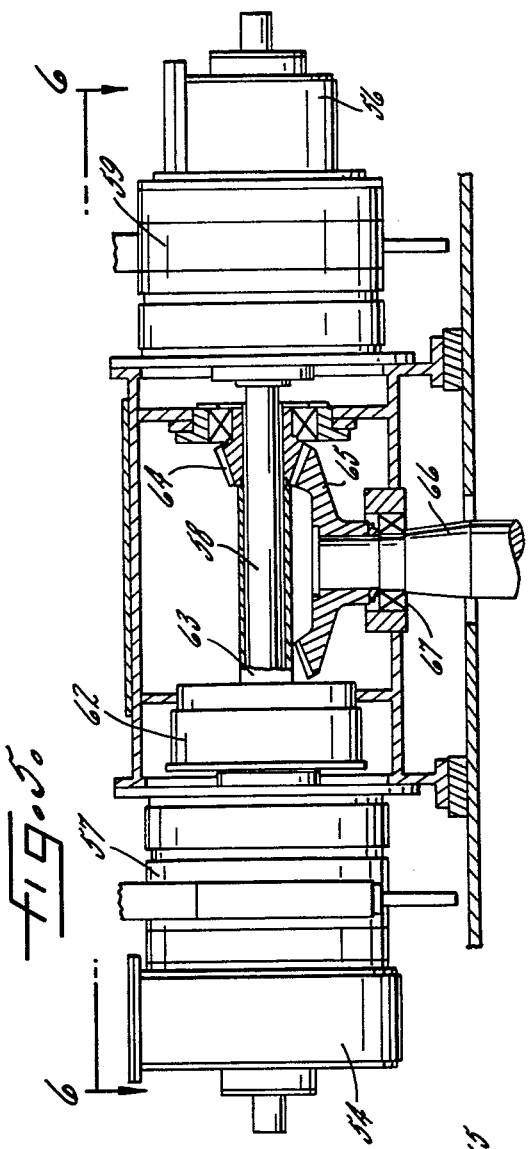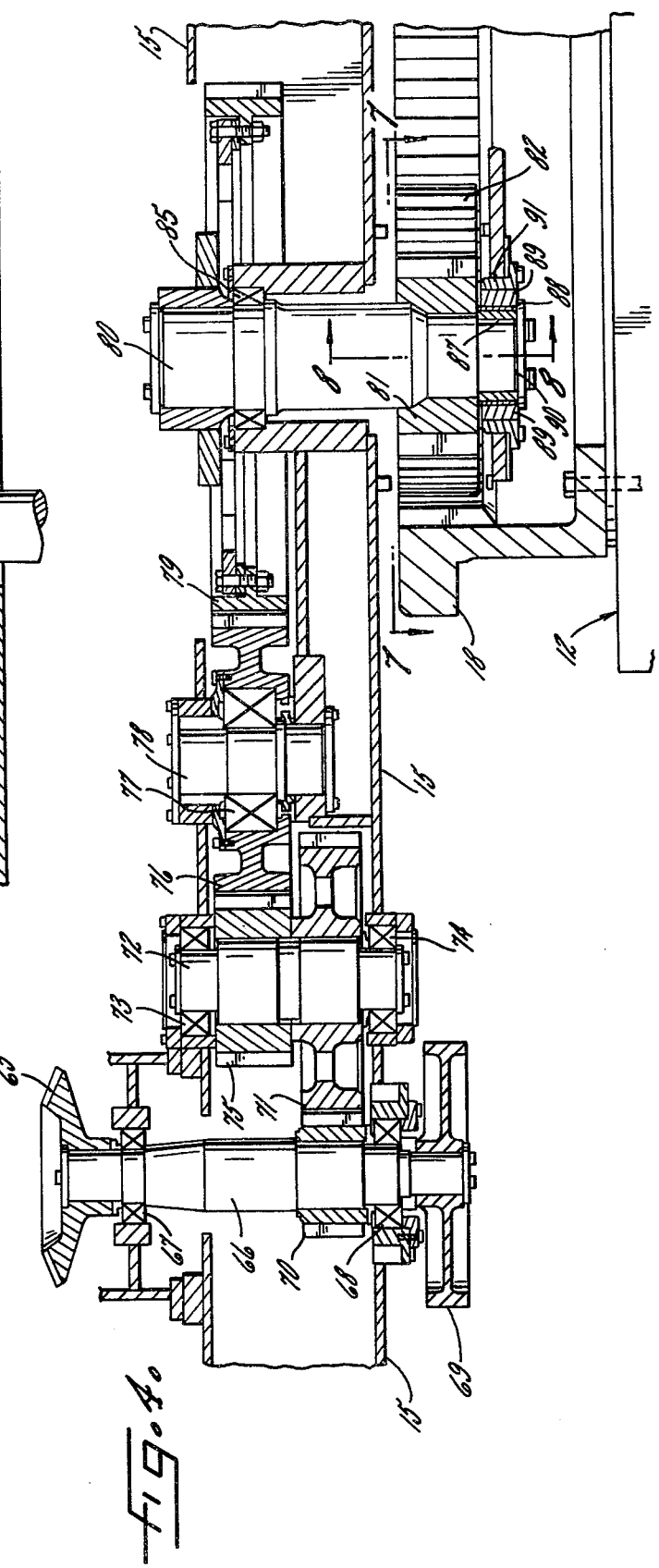

ROTATIONAL DRIVE ASSEMBLY

BACKGROUND OF THE INVENTION

This invention relates generally to rotational drive assemblies and more particularly concerns a swing drive assembly for load handling devices.

One of the difficulties with large rotational devices such as load handling devices mounted on rotatable beds or turntables is that, due to their size and heavy payloads, high stresses are imposed on the swing drive mechanism and particularly on the teeth of the swing drive gear. If substantially optimum tooth contact and alignment are not maintained during operating cycles the teeth wear rapidly and soon fail when subjected to the high stresses involved.

Accordingly, it is a primary aim of the present invention to provide an improved rotational drive assembly, which may be used to rotate the bed of a load handling device, such as a lift crane and which insures that substantially equalized drive tooth contact is maintained.

A more detailed object is to provide such a rotational drive assembly wherein the main drive shaft is universally journalled so that substantially equalized tooth contact is maintained between the drive gear mounted thereon and each of a pair of laterally disposed pinions which engage a ring gear.

It is also an object to journal the drive shaft in a self-aligning bearing and also to provide a slotted bearing block to limit excess lateral movement of the drive shaft and gear.

Other objects and advantages of the invention will become apparent upon reading the following detailed description and upon reference to the drawings, in which:

FIG. 4 is an enlarged fragmentary section taken substantially along line 4—4 in FIG. 3;

FIG. 5 is an enlarged, fragmentary section taken substantially along line 5—5 in FIG. 3;

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Figure 1:
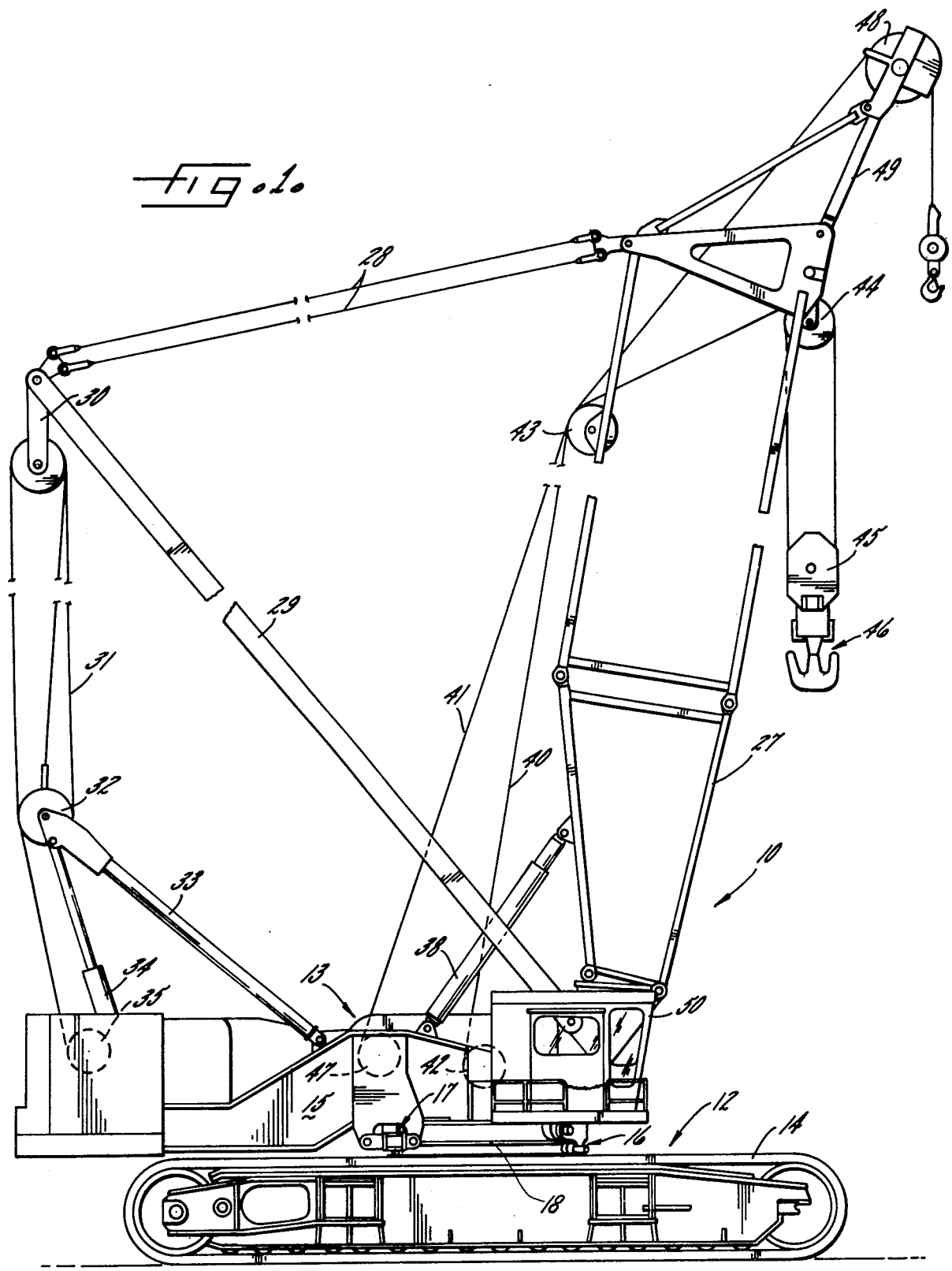
FIG. 1 is a fragmentary side elevation, somewhat schematic, of a load handling device in the form of a lift crane embodying the rotational drive assembly of the invention.

Turning now to the drawings, there is shown in FIG. 1 a load handling device in the form of a crane assembly 10 with which the present invention is associated. The crane assembly 10 includes lower works 12 and upper works 13. In the illustrated embodiment, the lower works 12 is supported by a pair of traction assemblies 14, but it should be understood that it could be wheel supported or even stationary insofar as the present invention is concerned.

Figure 2:
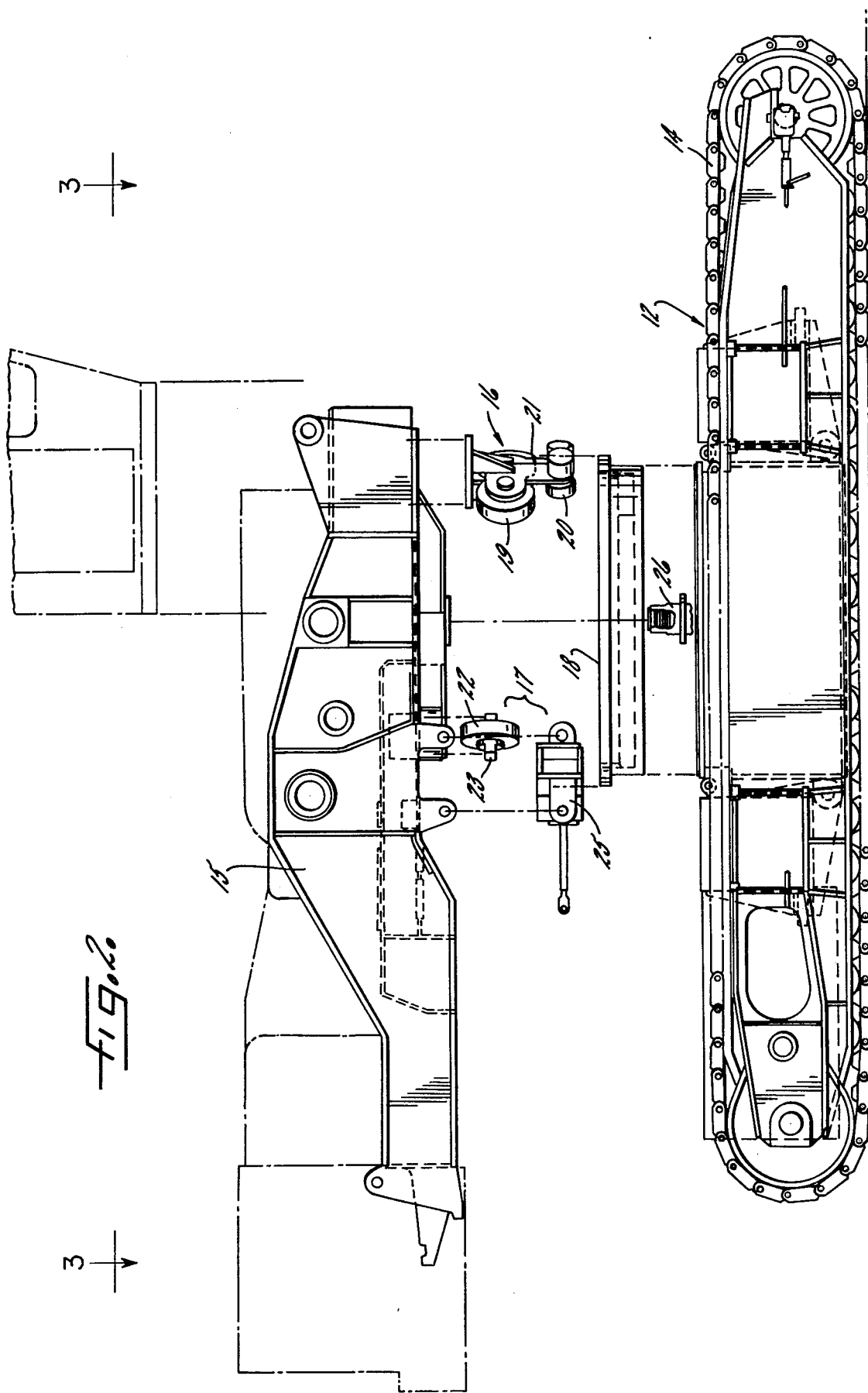
FIG. 2 is an enlarged, fragmentary side elevation of the rotatable bed and lower works of the crane in exploded view.
Figure 3:
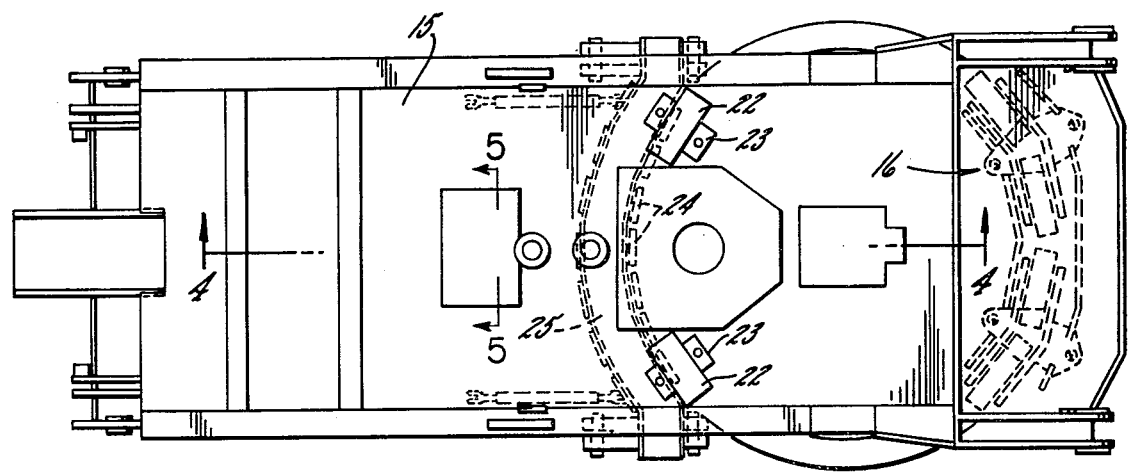
FIG. 3 is a section taken substantially along line 3—3 in FIG. 2.

The upper works 13 of the crane assembly 10 includes a rotatable bed 15 supported by front and rear roller assemblies 16 and 17 which engage a ring gear and roller path 18 on the lower works 12. As shown in FIG. 2, the front roller assemblies 16 each include a pair of upper load bearing rollers 19 and a pair of lower hook rollers 20 mounted on a roll carrier 21. The rear roller assembly 17 includes a pair of large load bearing rollers 22 each journalled on a shaft 23 pinned to the rotatable bed 15 and a plurality of hook rollers 24 journalled on an arcuate beam 25 (see FIG. 3) pinned at each end to the bed 15. It will be understood that the load bearing rollers 19 and 22 are supported on the upper surface of the roller path 18 and that the hook rollers 20 and 24 engage the under surface of the flange formed on the roller path. At the center of the ring gear and roller path is a pivot post 26 about which the rotatable bed 15 rotates.

The upper works 13 carries a pivotally mounted boom 27 supported by two pairs of laterally spaced pendants 28 (only one pair of which is shown) extending rearwardly to the upper ends of laterally spaced masts 29 each of which carries an equalizer assembly 30 around which a boom hoist line 31 runs. Another equalizer assembly 32 is carried by the upper end of a pair of pivotally mounted gantry members 33 which are raised and held in position by a back hitch assembly in the form of a pair of hydraulic cylinders 34 (only one being shown). It will be seen that each of the boom hoist lines 31 forms a three-part line between the equalizer assemblies 30, 32 and the other end of each line is wound on one drum 35 of a dual drum boom hoist at the rear end of the upper works 13.

To prevent overcentering of the boom 27 when it is raised, the upper works 13 carries automatic, cushioned boom stops 38. Both the boom 27 and the boom stops 38 may be removed from the upper works 13 when it is desired to move the crane 10 to another job site. In the illustrated embodiment, the crane 10 is equipped with two lift lines 40 and 41. The front lift line 40 is wound on a drum 42 and extends over a sheave 43 on the rear side of the boom 25 and then makes a double reach between upper and lower equalizer assemblies 44, 45, respectively, carried by the boom and a main hook assembly 46. The rear lift line 41 is wound on another drum 47 and extends over another sheave 43 and then over an upper pulley assembly 48 mounted on the end of a boom extension 49. It will be also understood that the upper works carries a suitable power source, such as a diesel engine (not shown) and appropriate variable control power transmission means for the major functions of the machine. The crane 10 is also provided with an operator's cab 50 within which the controls for the crane functions are located.

Figure 6:
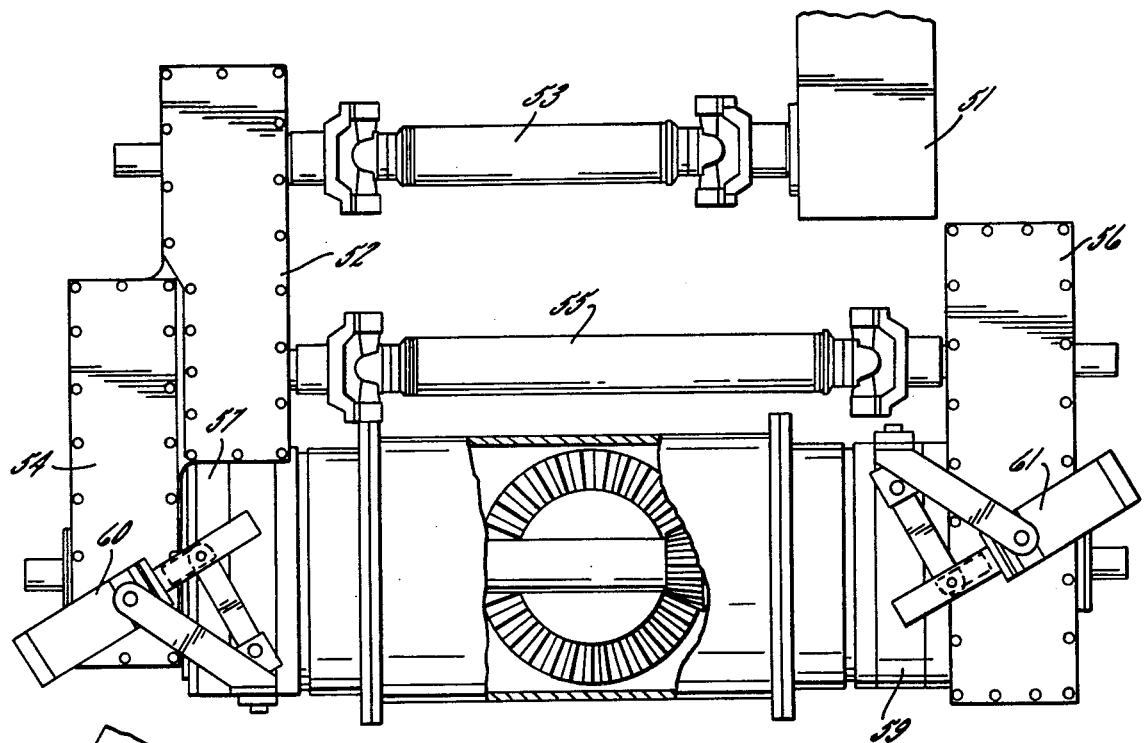
FIG. 6 is a fragmentary section taken substantially along line 6—6 in FIG. 5.

Pursuant to the present invention an improved swing drive assembly is provided for rotating the upper works 13 about the pivot post 26. Power from the engine (not shown) is transmitted from a transmission case 51 (see FIG. 6) to a transfer case 52 by a universal drive shaft 53. The output of the transfer case 52 is coupled directly to a first drive box 54 and through a universal drive shaft 55 to a second drive box 56. The first drive box 54 is directly coupled to a first variable torque converter 57 which selectively drives an output shaft 58 in one direction and the second drive box 56 is directly coupled to a second variable torque converter 59 which selectively drives the output shaft 58 in the opposite direction. Selection and variation of the respective torque converters 57 and 59 is accomplished through first and second remotely controlled actuators 60 and 61, respectively.

As shown in FIG. 5, the output shaft 58 is coupled to a planetary gear reduction unit 62 which, in turn, drives a shaft 63 concentric with shaft 58. The shaft 63 carries a bevel gear 64 in mesh with a gear 65 secured to a first swing drive shaft 66 journalled by bearings 67, 68 in the rotatable bed 15 and which carries a brake drum 69 at its lower end (see FIG. 4). Splined on the shaft 66 is a gear 70 that meshes with a gear 71 splined on an intermediate swing shaft 72 journalled by bearings 73, 74 in the rotatable bed. Also splined on the shaft 72 is a gear 75 that meshes with a gear 76 journalled by a bearing 77 carried on an idler shaft 78 secured to the rotatable bed. The gear 76 also meshes with a gear 79 secured to the final swing drive shaft 80.

Figure 8:
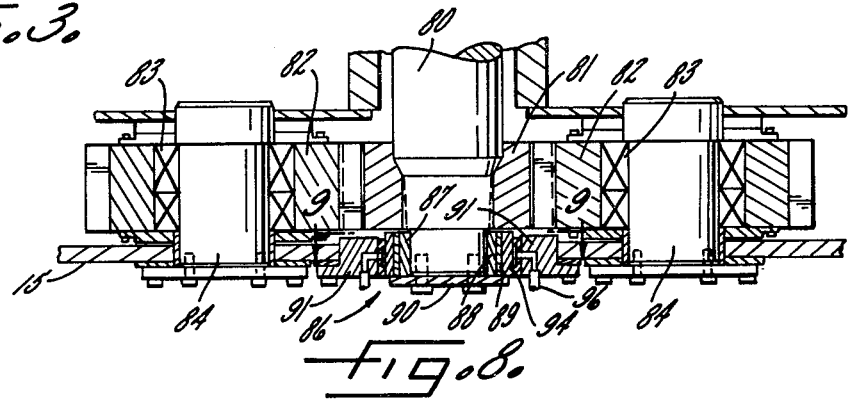
FIG. 8 is a fragmentary section taken substantially along line 8—8 in FIG. 4; and, FIG. 9 is an enlarged fragmentary section taken substantially along line 9—9 in FIG. 8.
Figure 7:
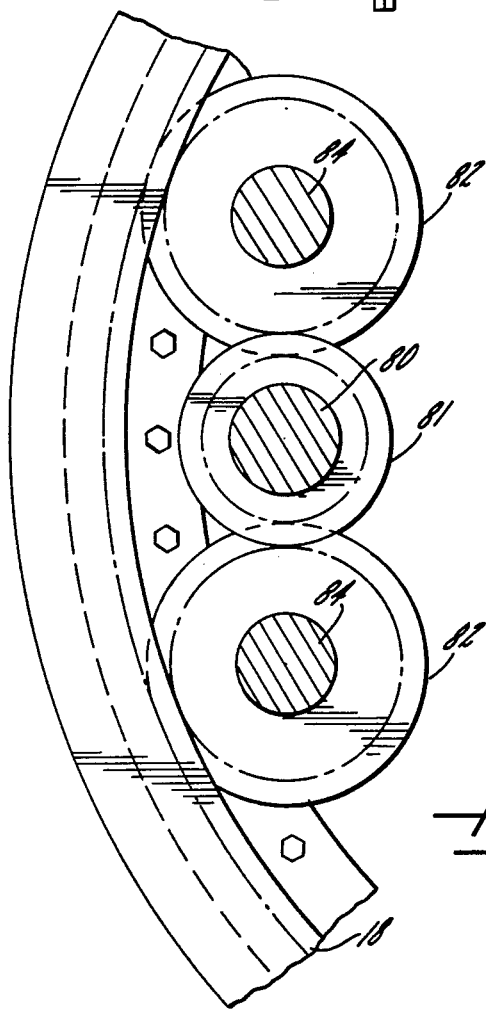
FIG. 7 is an enlarged, fragmentary section taken substantially along line 7—7 in FIG. 4.

In keeping with the present invention, the swing drive shaft 80 carries a drive gear 81 which meshes with a pair of pinion gears 82 journalled by bearings 83 on idler shafts 84 disposed on either side of the drive shaft 80, (see FIG. 8). The teeth of the pinion gears 82 also mesh with the internal teeth formed on the ring gear and roller path 18, (see FIGS. 4 and 7). According to the invention, the drive shaft 80 is universally journalled in the rotatable bed by means including a self-aligning bearing 85 which permits a limited range of movement of the drive gear 81 toward and away from the ring gear 18 and thus substantially equalizes tooth contact between the drive gear 81 and each of the pinion gears 82 as the drive shaft 80 is rotated in either direction. By maintaining substantially equalized tooth contact and optimum backlash, excessive stress is eliminated and gear life is substantially improved even when the drive assembly is subjected to repeated high load duty cycles in opposite directions.

Figure 9:
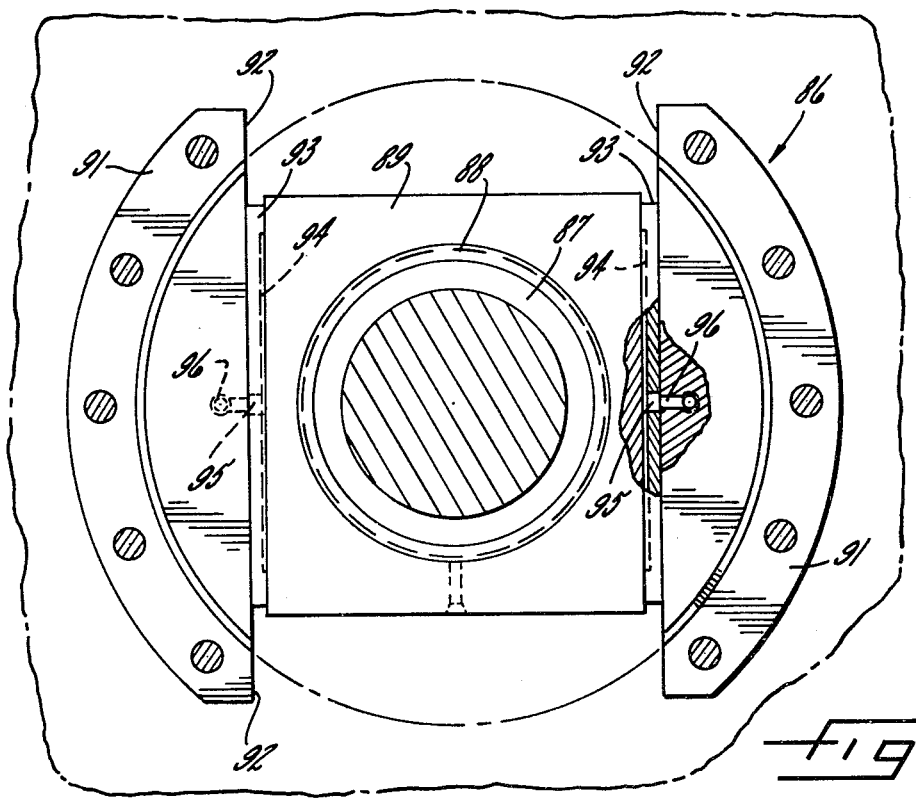

Pursuant to a further aspect of the invention, means including a slotted bearing block assembly 86 are provided, in the preferred embodiment, for resisting lateral movement of the drive gear 81 while permitting movement thereof toward and away from the ring gear 18. As shown in FIGS. 8 and 9, the bearing block assembly 86 includes a circular spacer 87, a concentric circular bushing 88 and a substantially square bearing block 89 held on the shaft 80 by an end plate 90. The bearing block 89 and hence the drive shaft 80 and gear 81 are restrained from lateral movement by a pair of arcuate members 91 secured to the rotatable bed 15 so as to form a substantially horizontal slot having parallel sides 92 extending longitudinally on opposite sides of the drive shaft 80. Preferably a pair of substantially flat wear plates 93 are interposed between the sides of the bearing block 89 and the sides 92 of the slot formed by the members 91. The wear plates 93 may also be provided with a groove 94 in their face communicating through an opening 95 to a lubricant passage 96 drilled in each of the members 91.

From the foregoing it will be seen that the drive shaft is journalled in the self-aligning bearing 85 and bearing block assembly 86 for rotation and for permitting a limited range of movement of the drive gear 81 toward and away from the ring gear 18 to substantially equalize tooth contact between the drive gear 81 and the pinion gears 82. Referring to FIG. 4, it will also be seen that the bearing 85 is disposed in the central plane passing through the gears 76 and 79. This essentially eliminates any tilting moment that might otherwise be imparted to the drive shaft 80 by the gears 76 and 79.

We claim as our invention:

1. A drive mechanism for causing relative movement between first and second parts comprising, in combination, a first gear mounted on said first part, a drive shaft carried on said second part, a drive gear secured to said shaft adjacent the teeth of said first gear, a pair of pinion gears journalled on idler shafts disposed laterally on either side of said drive shaft and meshing with the teeth of said drive gear and said first gear, and means on said second part journalling said drive shaft for rotation and for permitting a limited range of movement of said drive gear toward and away from said first gear to substantially equalize tooth contact force between said drive gear and each of said pinion gears as said drive shaft is rotated.

2. A drive mechanism as defined in claim 1, wherein said means for journalling said drive shaft includes a self-aligning bearing.

3. A drive mechanism as defined in claim 1, wherein said first gear is an internally toothed ring gear and said drive shaft projects vertically within said ring gear with said drive gear disposed in the plane of said ring gear teeth.

4. A drive mechanism as defined in claim 3 wherein said means for journalling said drive shaft includes a self-aligning bearing and means for resisting lateral movement of said drive gear.

5. A drive mechanism as defined in claim 4 wherein said means for resisting lateral movement of said drive gear includes retainer means carried on said second part and defining a substantially horizontal slot having parallel sides extending longitudinally on opposite sides of said drive shaft and bearing means carried on said drive shaft for engagement with the sides of said slot.

6. A drive mechanism as defined in claim 5 wherein said bearing means carried on said drive shaft includes a bearing block having parallel lateral sides dimensioned for reception within said slot and a central circular aperture dimensioned to receive said lower end of said drive shaft.

7. A drive mechanism as defined in claim 6 wherein said bearing means also includes a circular bushing interposed between said drive shaft and said bearing block and substantially flat wear plates interposed between the sides of said bearing block and the sides of said slot.

8. A drive mechanism as defined in claim 1 wherein said first part is a base for a load handling device and said second part is a rotatable bed journalled for rotation relative to said base.

9. A drive mechanism as defined in claim 3 wherein said ring gear is mounted on a base for a load handling device and said drive shaft is carried on a bed rotatable relative to said base.

10. A drive mechanism as defined in claim 9 wherein said means for journalling said drive shaft includes a self-aligning bearing and means for resisting lateral movement of said drive gear.

* * * * *